United States Patent
Zhang et al.

(10) Patent No.: US 12,402,015 B2
(45) Date of Patent: Aug. 26, 2025

(54) SPECTRUM ACCESS METHOD AND SYSTEM USING PRIOR KNOWLEDGE-BASED DOUBLE-ACTION REINFORCEMENT LEARNING

(71) Applicant: National University of Defense Technology, Nanjing (CN)

(72) Inventors: Jianzhao Zhang, Nanjing (CN); Fuqiang Yao, Nanjing (CN); Yongxiang Liu, Nanjing (CN)

(73) Assignee: National University of Defense Technology, Nanjing (CN)

( * ) Notice: Subject to any disclaimer, the term of this patent is extended or adjusted under 35 U.S.C. 154(b) by 46 days.

(21) Appl. No.: 17/903,183

(22) Filed: Sep. 6, 2022

(65) Prior Publication Data
US 2023/0397012 A1    Dec. 7, 2023

(30) Foreign Application Priority Data
Sep. 7, 2021 (CN) .......................... 202111042843.4

(51) Int. Cl.
*H04W 16/14* (2009.01)
*H04W 72/53* (2023.01)

(52) U.S. Cl.
CPC ........... *H04W 16/14* (2013.01); *H04W 72/53* (2023.01)

(58) Field of Classification Search
CPC . H04W 16/14; H04W 72/53; H04W 72/0453; H04W 72/541
See application file for complete search history.

(56) References Cited

U.S. PATENT DOCUMENTS 11,403,142 B1 *   8/2022   Chang ...................... G06F 9/466
11,641,579 B1 *   5/2023   Mukherjee ............ H04W 48/18
                                                          370/329
(Continued)

FOREIGN PATENT DOCUMENTS

CN           112367131 A        2/2021

OTHER PUBLICATIONS

State Intellectual Property Office of People's Republic of China, First Office Action on Application No. 202111042843.4, dated Jul. 14, 2023 English translation.
(Continued)

*Primary Examiner* — Santiago Garcia
(74) *Attorney, Agent, or Firm* — Anthony Claiborne (57) ABSTRACT

The present disclosure provides a spectrum access method and system using prior knowledge-based double-action reinforcement learning, and belongs to the technical field of electromagnetic spectrum. The method includes evaluating and screening prior knowledge, initializing a Q-table, and confirming a current state; and performing Q-learning by: firstly, decomposing an action space into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, wherein the biased information is a reward value. The system is configured to implement the proposed method. By adoption of the method, better performance is achieved, and the efficiency of spectrum access can be improved.

18 Claims, 5 Drawing Sheets

(56) References Cited

U.S. PATENT DOCUMENTS

| | | | | |
|---|---|---|---|---|
| 2003/0135331 | A1* | 7/2003 | Hogue | G16B 15/20 435/7.1 |
| 2010/0195572 | A1* | 8/2010 | Sadek | H04L 5/0033 370/328 |
| 2011/0292851 | A1* | 12/2011 | Fong | H04L 5/0098 370/311 |
| 2015/0341191 | A1* | 11/2015 | Jacquet | H04W 74/0816 375/237 |
| 2015/0365871 | A1* | 12/2015 | Hu | H04W 72/0453 370/331 |
| 2020/0396633 | A1* | 12/2020 | Tseng | H04L 5/001 |
| 2021/0150417 | A1* | 5/2021 | Fadel Argerich | G06N 20/20 |
| 2021/0258988 | A1* | 8/2021 | Balakrishnan | G06N 3/08 |
| 2021/0326695 | A1* | 10/2021 | Vitebsky | G06N 3/08 |
| 2022/0188623 | A1* | 6/2022 | Price | G06N 3/08 |
| 2022/0295465 | A1* | 9/2022 | Siomina | H04W 24/10 |
| 2023/0061247 | A1* | 3/2023 | Mishra | H04W 24/02 |
| 2023/0403565 | A1* | 12/2023 | Bhuyan | H04B 17/336 |

OTHER PUBLICATIONS

State Intellectual Property Office of People's Republic of China, Second Office Action on Application No. 202111042843.4, dated Dec. 1, 2023 English translation.

* cited by examiner

SPECTRUM ACCESS METHOD AND SYSTEM USING PRIOR KNOWLEDGE-BASED DOUBLE-ACTION REINFORCEMENT LEARNING

CROSS REFERENCE TO RELATED APPLICATION

This patent application claims the benefit and priority of Chinese Patent Application No. 202111042843.4, filed with the China National Intellectual Property Administration on Sep. 7, 2021, the disclosure of which is incorporated by reference herein in its entirety as part of the present application.

TECHNICAL FIELD

The present disclosure belongs to the technical field of communication, and specifically relates to a spectrum access method and system using prior knowledge-based double-action reinforcement learning.

BACKGROUND

The sixth-generation wireless (6G) technology is expected to meet the future needs of social development for hyperlink, high density, data-driven techniques and intelligence. Moreover, higher speed and more robust communication capabilities are required for applications such as electronic health and automatic drive. For this reason, there is a greater demand for spectrum resources and more efficient spectrum utilization technologies. For the former, THz technology is developing at a rapid pace, while for the latter, more efficient spectrum sharing methods need to be developed based on machine learning, artificial intelligence and other technologies. Among them, one of the biggest challenges is how to provide reliable communication services for ultra-high-density users in a rapidly changing electromagnetic environment. Ultra-high-density users mean shortage of spectrum resources, and the jamming to high-priority users and the mutual interference of users with the same priority will become the key factors affecting spectrum utilization and user performance.

How to achieve efficient spectrum access in a complex electromagnetic environment has always been a research hotspot in the field of mobile communication. Reinforcement learning is considered as an effective method to solve the problem of spectrum management. However, it is faced with the problem of cold start, which limits the efficiency of spectrum access by using reinforcement learning, and is inconsistent with the fact that users have a prior knowledge of the environment in an actual scenario, causing failure of users to quickly adapt to the electromagnetic environment.

SUMMARY

To address the foregoing technical problem, the present disclosure provides a spectrum access method and system using prior knowledge-based double-action reinforcement learning, so as to improve the efficiency of spectrum access.

The present disclosure adopts the following solutions: in one aspect, an anti-jamming spectrum access method using prior knowledge-based double-action reinforcement learning is provided, including:
evaluating and screening prior knowledge, initializing a Q-table, and confirming a current state; and
performing Q-learning by: firstly, decomposing an action space into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, where the biased information is a reward value.

Further, said choosing actions in turn according to the dimensions specifically includes:
setting two dimension parameters x and y which are random numbers of [0,1];
when $x<\varepsilon$, choosing an action in one dimension according to a random probability, otherwise, calculating a mean value of the Q-table in the dimension, and choosing an action in the dimension according to a maximum value, where F is a constant; or
when $y<\varepsilon$, choosing an action in the other dimension according to a random probability, otherwise, calculating an action in the dimension according to a maximum value.

Further, said updating the Q-table in combination with biased information specifically includes:
acquiring a reward value;
determining a state value at a next moment;
updating the Q-table; and
adjusting the Q-table using the biased information.

Further, said adjusting the Q-table using the biased information specifically includes:
in case the reward value is taken as the biased information, and the reward value is less than zero, if $Q(s, a_1, a_2)>0$, making $Q(s, a_1, a_2)=const1 \times Q(s, a_1, a_2)$; otherwise, making $Q(s, a_1, a_2)=(1/const1) \times Q(s, a_1, a_2)$, where const1 denotes a constant, and $a_1$ and $a_2$ respectively denote actions in the two dimensions; and
in case the reward value is less than a statistical average reward value $\overline{R}$, if $Q(s, a_1, a_2)>0$, making $Q(s, a_1, a_2)=const2 \times Q(s, a_1, a_2)$; otherwise, making $Q(s, a_1, a_2)=(1/const2) \times Q(s, a_1, a_2)$, where const2 denotes a constant.

Further, said acquiring a reward value specifically includes: taking a ratio of a channel capacity to a utility function as a reward which is expressed in the following formula:

$$R = u_1 \cdot u_2 \cdot \left( \frac{c}{u \cdot W} - \frac{1}{k_1 \cdot Th} \right)$$

Where c denotes a channel capacity, u denotes a Kosca utility function, W denotes a channel bandwidth, $k_1$ denotes a constant, Th denotes a jamming threshold, $u_1$ denotes a reward value balancing coefficient on the order of magnitudes, and $u_2$ denotes a duration guidance coefficient.

Further, a Q-value is updated according to the following formula:

$$Q(s, a_1, a_2) = (1-\alpha) \times Q(s, a_1, a_2) + \alpha \times \left[ r + \gamma \max_a Q(s', a_1, a_2) \right]$$

Where $\alpha$ denotes a learning rate, $\gamma$ denotes an attenuation factor, s and s' denote a state at a current state and a state at a next moment, respectively, and a denotes an optimal action set in the state at the next moment, where a includes $a_1$ and $a_2$.

Further, said evaluating and screening prior knowledge specifically includes:

defining accuracy of the prior knowledge according to Pearson's correlation coefficient, and choosing information with high accuracy as prior information.

Further, a state at any moment involves a difference value and a mean value of first two time slots of each channel.

In another aspect, the present disclosure provides an anti-jamming spectrum access system using prior knowledge-based double-action reinforcement learning, and performing spectrum access based on the foregoing method, the system including:

a prior information evaluating and state confirming unit configured to evaluate and screen prior knowledge, initialize a Q-table, and confirm a current state; and a learning unit configured to perform Q-learning by: firstly, decomposing an action space into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, where the biased information is a reward value.

Compared with the prior art, the present disclosure has the following advantages: the Q-table is initialized using prior knowledge to guide an agent to accelerate algorithm convergence and improve algorithm performance. In view of the influence of different levels of accuracy of prior knowledge on agent learning, the present disclosure considers the reward value as biased information, and encourages the agent to choose an action with a high reward value and reduce the influence of wrong actions on a system, thereby avoiding the negative guidance of inaccurate prior knowledge on the agent. Meanwhile, it is also verified through simulation experiments that the present disclosure can significantly reduce the number of explorations required to obtain highly expected rewards, and at the same time improve the final learning performance and make full use of prior knowledge with different levels of different accuracy, so as to improve the gain and the efficiency of spectrum access.

DETAILED DESCRIPTION OF THE EMBODIMENTS

Figure 1:
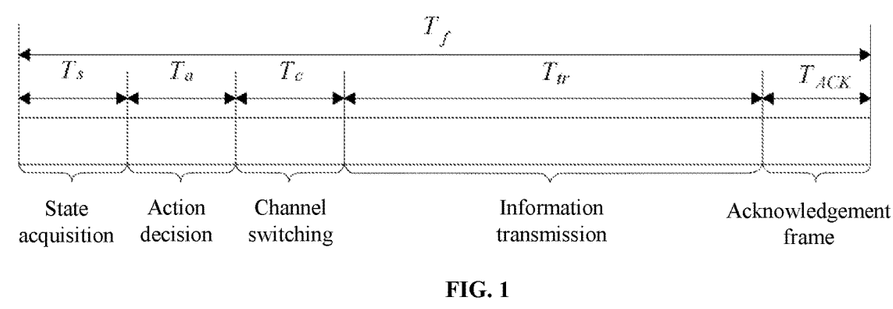
FIG. 1 is a schematic diagram of a time slot and frame structure according to embodiments of the present disclosure.

Assume that there are M channels, 1 cognitive user and 1 jammer in a current network. Cognitive users have the ability of spectrum sensing, autonomous learning and decision-making. In a model according to embodiments of the present disclosure, a frame structure with a fixed transmission time $T_f$ is considered, and each frame includes five stages of state acquisition, action decision-making, channel switching, information transmission and confirmation, as shown in FIG. 1.

At the stage of state acquisition, an agent confirms the current state according to partial historical information collected, and the time required is $T_s$. Cognitive users make a decision on an action to take based on the current state, and the decision-making time is $T_a$. The agent switches among the channels according to the decision to complete information transmission, and obtains the reward value given by the environment according to an acknowledgment frame, and times required are $T_c$, $T_{tr}$ and $T_{ACK}$, respectively.

Corresponding throughputs may be acquired at each information transmission based on action decision-making. The throughput is affected by the transmission power and the jamming power at the current moment. According to embodiments of the present disclosure, one objective is to make full use of spectrum resources on the premise of satisfying the lowest communication quality acceptable. Therefore, according to one embodiment of the present disclosure, target $\mu^{tar}$ of the Signal-to-Interference and Noise Ratio (SINR) is 1. Assume that the jamming threshold of the channel is Th, if a jamming power exceeds the threshold, the way of increasing the transmission power to resist jamming may lead to excessive loss at a transmitting end, so the transmission power is fixed at Th to reduce the loss. Therefore, the throughput $T_p$ of a single transmission can be expressed as follows:

$$T_p = \frac{T_f - (T_s + T_a + T_c + T_{ACK})}{T_f} \cdot c_1 + \frac{T_f - T_{ACK}}{T_f} \cdot \sum_{i=2}^{b} c_1 \quad (1)$$

Where in formula (1), b denotes a length of a time slot of the current transmission, and $c_i$ ($i \in b$) denotes a channel capacity of each time slot, which is defined as follows:

$$c = W \cdot \log_2(1 + SINR) \quad (2)$$

$$c = W \cdot \log_2(1 + SINR) \quad (2)$$

$$SINR = \begin{cases} \mu^{tar} & P_j \leq Th \\ \dfrac{Th}{P_j + \sigma^2} & P_j > Th \end{cases} \quad (3)$$

Where in formula (2), W denotes a channel bandwidth; and in formula (3), $P_j$ denotes a jamming power, and $\sigma^2$ denotes a noise power.

Figure 2:
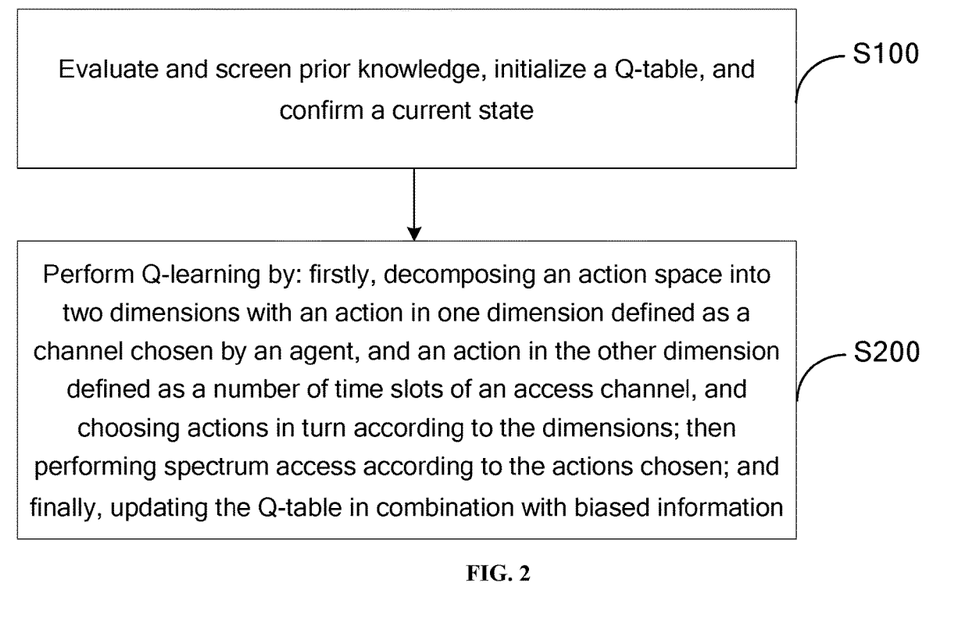
FIG. 2 is a flowchart of an anti-jamming spectrum access method using prior knowledge-based double-action reinforcement learning according to embodiments of the present disclosure.

Under the above model, with reference to FIG. 2, the spectrum access method using prior knowledge-based double-action reinforcement learning according to embodiments of the present disclosure includes:

S100: evaluate and screen prior knowledge, initialize a Q-table, and confirm a current state.

Due to the possibility of inaccurate prior knowledge, the iteration of the agent may be hindered when the prior knowledge is not accurate. Therefore, in embodiments of the present disclosure, the issue regarding the accuracy of prior knowledge is considered. Aiming at the problem regarding the accuracy of prior knowledge, a measurement method based on Pearson's correlation coefficient is proposed in the embodiments of the present disclosure. Linear correlation between two variables is measured using Pearson's correlation coefficient, which is defined as follows:

$$\rho_{X,Y} = \frac{cov(X, Y)}{\sigma_X \sigma_Y} = \frac{E[(X - \mu_X)(Y - \mu_Y)]}{\sigma_X \sigma_Y} \quad (4)$$

Where $\mu_X$ and $\mu_Y$ denote mean values of variables X and Y, respectively, and $\sigma_x$ and $\sigma_y$ denote standard deviations of X and Y, respectively. The absolute value of $\rho_{X, Y}$ is in direct proportion to the correlation between the variables, and the correlation degree of Pearson's correlation coefficient is shown in Table (1):

TABLE 1

Evaluation criterion for Pearson's correlation coefficient

| $|\rho_{X, Y}|$ | Degree of correlation |
| --- | --- |
| $0 \le |\rho_{X, Y}| < 0.2$ | Fairly weak correlation or no correlation |
| $0.2 \le |\rho_{X, Y}| < 0.4$ | Weak correlation |
| $0.4 \le |\rho_{X, Y}| < 0.6$ | Moderate correlation |
| $0.6 \le |\rho_{X, Y}| < 0.8$ | Strong correlation |
| $0.8 \le |\rho_{X, Y}| < 1$ | Fairly strong correlation |

According to embodiments of the present disclosure, given that double actions are considered, the Q-table is three-dimensional, and the correlation between different states cannot be measured, the similarity p of prior knowledge is defined as follows:

$$_{..}\rho = \frac{1}{S}\sum_{i=j}^{S} \frac{cov(Q_X(i), Q_Y(i))}{\sigma_{Q_X(i)} \cdot \sigma_{Q_Y(i)}} = \quad (5)$$

$$\frac{1}{S}\sum_{i=j}^{S} \frac{E[(Q_X(i) - \mu_{Q_X(i)}) \cdot (Q_Y(i) - \mu_{Q_Y(i)})]}{\sigma_{Q_X(i)} \cdot \sigma_{Q_Y(i)}}$$

Where X and Y are different matrices to be compared, and $Q_X(i)$ and $Q_Y(i)$ constitute a two-dimensional Q matrix $Q(a_1, a_2)$ in state i, in which $a_1$ and $a_2$ denote actions in the two dimensions, respectively.

According to embodiments of the present disclosure, the similarity of the prior knowledge is analyzed by the above method, and the prior knowledge with the highest similarity is chosen during spectrum access.

Q-learning (also known as reinforcement learning) can update its own strategy online through interaction with the environment, so as to seek the optimal policy for the environment. According to embodiments of the present disclosure, a channel state can be modeled as an environment, a cognitive user can be modeled as an agent, the state and information action information are stored in the Q-table, and it is required to consider state parameters when using reinforcement learning for spectrum access. A state space is defined as follows:

ci=$P_{j,t-1} - P_{j,t-2}$i∈ M is defined as a difference value of first two time slots of an ith channel, and $$m_1 = \frac{P_{j,i-1} + P_{j,i-2}}{2}$$

i∈ M is defined as a mean value of the first two time slots of the ith channel. At moment t, the state space is defined as the difference value and mean value at moment t–1 and at moment t–2 for each channel, which is expressed as follows:

$$\text{state} = \begin{bmatrix} c_1 & m_1 \\ c_2 & m_2 \\ & \vdots \\ c_M & m_M \end{bmatrix} i \in M \quad (6)$$

That is, according to embodiments of the present disclosure, a state at any moment involves a difference value and a mean value between first two time slots of each channel. The state space is too large, and the difference value and mean value only reflect the trend but carry no practical meaning. Therefore, according to embodiments of the present disclosure, the number of state values can be quantified to S to reduce the state space, thereby improving the performance of the method.

S200: perform Q-learning by: firstly, decomposing an action space into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, where the biased information is a reward value. In the process of Q-learning, spectrum access is achieved.

According to embodiments of the present disclosure, first detecting any time slot of the frame structure in FIG. 1 prior to access, despite the advantage of effectively avoiding cognitive users from being jammed by the jammer, may take up a lot of resources of the system. Ideally, during channel access, multiple time slot frames are transmitted directly, and the transmission is stopped before the jammer interferes with the current channel. Therefore, the agent should not only choose the channel to access, but also decide how many time slots to access. Therefore, according to embodiments of the present disclosure, a double-action scheme is designed to decompose an action space into two dimensions, where actions in one dimension are defined as channels chosen by an agent, and actions in the other dimension are defined as a number of time slots of an access channel. First, actions in one dimension are chosen, then actions in the other dimension are merged to the current dimension by averaging, and the subsequent dimensional action is decided on after the decision-making on the current dimensional action.

Specifically, set two dimension parameters x and y, which are random numbers of [0,1];

when x<ε, choose an action in dimension according to a random probability, otherwise, calculating a mean value of the Q-table in the action dimension, and choose an action in the dimension according to a maximum value; or when y<ε, choose an action in the other dimension according to a random probability, otherwise, calculate an action in the dimension according to a maximum value. According to embodiments of the present disclosure, the following pseudocode can be offered:

| Double actions |
| --- |
| 1: function Action(Q.state) |
| 2:    x,y = rand( ); |
| 3:    if x < ε |
| 4:       Choose $a_1$ according to a random probability |
| 5:    else |
| 6:       Calculate a mean value of the Q-table in a dimension of $a_1$, and choose $a_1$ according to a maximum value |
| 7:    if y < ε |
| 8:       Choose $a_2$ according to a random probability |
| 9:    else |
| 10:      Choose $a_2$ according to a maximum value |
| 11:  Return $a_1$, $a_2$ |
| 12: end function |

Where F denotes a constant of [0, 1], and $a_1$ and $a_2$ denote actions in the two dimensions, respectively. For example, $a_1$ may be defined as a channel chosen by an agent, and $a_2$ may be defined as a number of time slots of an access channel. In the following instructions, $a_1$ is defined as the channel chosen by the agent, and $a_2$ is defined as the number of time slots of an access channel.

The traditional reinforcement learning process is to choose a specific action for the current state. If multiple actions are mapped to a single action output, the action space will be too large to traverse to the optimal solution. According to embodiments of the present disclosure, a double-action mode is proposed to decompose and output the double actions, thereby achieving higher efficiency in the process of spectrum access.

Once an action is chosen, the spectrum access is carried out.

Then the Q-table is updated in combination with biased information. According to embodiments of the present disclosure, the Q-table may be updated in the following manner:

S310: acquire a reward value.

In order to encourage the agent to choose a channel with low jamming degree, and access it for a long time under a jamming threshold as much as possible, the Kosca utility function is used to design the reward function, which helps to improve the spectrum utilization and reduce the frequency of channel switching. The Kosca utility function is shown in formula (7):

$$u = k_1 \cdot p + k_2 \cdot (\mu^{tar} - \mu)^2 \quad (7)$$

Where $k_1$ and $k_2$ are constants, p denotes transmission power, $\mu^{tar}$ denotes a target Signal-to-Interference and Noise Ratio (SINR), and denotes an actual SINR. The Kosca utility function is intended to minimize the transmission power under the premise of enabling the agent to meet the target SINR, so as to reduce pollution to the spectrum environment, thus saving system resources. According to the present disclosure, in order to encourage the agent to choose a channel with a low jamming degree, and the reward function is designed as the ratio of the channel capacity to the utility function, as shown in the formula (8):

$$R = u_1 \cdot u_2 \cdot \left( \frac{c}{u \cdot W} - \frac{1}{k_1 \cdot Th} \right) \quad (8)$$

Where R denotes a reward value, c denotes a channel capacity, u denotes a Kosca utility function, W denotes a channel bandwidth, $k_1$ denotes a constant, and Th is a jamming threshold $$\frac{1}{k_1 \cdot Th}$$

designed as a fixed number of losses, so as to give the agent punishment for access beyond the threshold. $u_1$ is a reward value balancing coefficient on the order of magnitudes to balance the reward value and give the agent a more severe punishment for missing detection; $u_2$ denotes a duration guidance coefficient to encourage the agent to adopt the action with longer access duration and reduce the switching frequency. To sum up, cognitive users are supposed comprehensively consider the channel quality in their decision-making and choose the action with the highest reward value for channel choosing and access.

S320: observe a state value at a next moment. The state at the next moment involves the difference value and mean value between the state at a current moment and the state at a previous state.

S330, update the Q-table.

The agent iterates a policy by acquiring the state, the decided action and the reward value, with a goal to seek an optimal policy π, such that $Q^\pi(s, a_1, a_2)$ reaches a maximum value under the current policy. The Q-value is updated according to formula (9):

$$Q(s, a_1, a_2) = (1 - \alpha) \times Q(s, a_1, a_2) + \alpha \times \left[ r + \gamma \max_a Q(s', a_1, a_2) \right] \quad (9)$$

Where α (0<α<1) denotes a learning rate, which represents the ratio of Q-values currently learned to the agent itself, where the higher the α value is, the more importance the agent attaches to the learned Q value; γ (0<γ<1) denotes an attenuation factor, where the higher the γ value, the more importance the agent attaches to the future reward; S and s' denote the current state and the next state, respectively, and a denotes a best action in the next state, including $a_1$ and $a_2$.

S340: adjust the Q-table using the biased information.

In a reinforcement learning method, balancing exploration and utilization is a fundamental problem. In order to improve the exploration efficiency, a reinforcement learning method based on biased information guidance is proposed in the embodiments of the present disclosure. Since the biased information varies in representation, in the embodiments of the present disclosure, the reward value is used as the biased information.

In the iterative process of reinforcement learning, different action decisions will lead to different reward values. If the agent does not explore sufficiently, the algorithm is easily trapped into a locally optimal solution. Herein, the statistical average reward value $\overline{Q}$, is considered, and the two constants const1 and const2 are set. If the current reward value is negative or lower than the average reward, the current Q value is given different penalties, such that the algorithm can avoid wrong actions and sub-optimal actions, and explore a globally optimal solution.

Specifically, said update Q-table using biased information specifically includes:

in case the reward value is taken as the biased information, and the reward value is less than zero, if $Q(s, a_1, a_2) > 0$, making $Q(s, a_1, a_2) = \text{const1} \times Q(s, a_1, a_2)$; otherwise, making $Q(s, a_1, a_2) = (1/\text{const1}) \times Q(s, a_1, a_2)$, where const1 denotes a constant; and in case the reward value is less than a statistical average reward value $\overline{R}$, if $Q(s, a_1, a_2) > 0$, making $Q(s, a_1,$ $a_2$)=const2×Q(s, $a_1$, $a_2$); otherwise, making Q(s, $a_1$, $a_2$)=(1/const2)×Q(s, $a_1$, $a_2$), where const2 denotes a constant. According to embodiments of the present disclosure, a pseudocode capable of achieving corresponding functions is offered as follows:

| | Biased information |
|---|---|
| 1: | function Bias(reward,const1,const2) |
| 2: | if reward < 0 |
| 3: | if Q(s,$a_1$,$a_2$) > 0 |
| 4: | Q(s,$a_1$,$a_2$) = const1×Q(s,$a_1$,$a_2$) |
| 5: | else |
| 6: | Q(s,$a_1$,$a_2$) = (1/const1)×Q(s,$a_1$,$a_2$) |
| 7: | elseif reward < $\overline{R}$ |
| 8: | if Q(s,$a_1$,$a_2$) > 0 |
| 9: | Q(s,$a_1$,$a_2$) = const2×Q(s,$a_1$,$a_2$) |
| 10: | else |
| 11: | Q(s,$a_1$,$a_2$) = (1/const2)×Q(s,$a_1$,$a_2$) |
| 12: | Return the Q-table |
| 13: | end function |

In order to verify that the method provided in the embodiments of the present disclosure has a better effect compared with the prior art, the method in the embodiments is verified via simulation.

The specific setting is as follows: assume there are M (M=5) channels, 1 cognitive user and 1 jammer in a current network. The jammer works in a manner of sweep jamming, and the jamming power of each channel varies sinusoidally over time, namely, $P_{j,i}$=Asin($\omega$t+$\varphi_i$)i∈M, where A=10 dBm denotes an amplitude, $\omega$ denotes an angular frequency, and $\varphi_i$ denotes a phase of each channel. The power of additive white Gaussian noise is 1 dBm, and the jamming threshold Th is set to 4 dBm. In order to prevent the state space from getting too large, the difference value c and the mean value m in the state values are quantified to reduce the state space to S=40, thereby improving algorithm performance. The parameter in Q-learning is set as follows: learning rate $\alpha$=0.2, and discount factor $\gamma$=0.4. $\varepsilon$ is set to the value that uniformly declines with time slots, in order to balance the exploration and utilization during reinforcement learning. In a reward value function, the constant value $u_1$ of the balance order of magnitudes is $$u_1 = \begin{cases} 1, & p \leq Th, \\ 10, & p > Th \end{cases},$$

and the duration guidance coefficient $u_2$ is $$u_2 = \begin{cases} 0.8 & a_2 < 2/3 \times \overline{a}, \\ 1.25 & a_2 \geq 2/3 \times \overline{a} \end{cases},$$

where $\overline{a}$ denotes an average access duration counted at the current moment. In the biased information, the constants const1 and const2 are set to 0.6 and 0.9, respectively. Assume that in the time slot and frame structure, the frame length of each time slot is 50 ms, the time for state confirmation is 3 ms, the time for decision making is 3 ms, the time for channel switching is 5 ms, and the duration for an acknowledgment frame is 1 ms.

The Monte Carlo method is used to simulate 500 times, and an arithmetic mean value is taken; and values of 30,000 time slots are used for each simulation.

The proposed method may be evaluated from two aspects, namely, the average throughput and the valid access duration, where the average throughput $\overline{T}_p$ is the mean value of throughputs of the agent within the current access duration, which is expressed as follows:

$$\overline{T}_p = \frac{T_p}{a_2} \tag{10}$$

Where $T_p$ denotes a throughput of this transmission, as shown in formula (1).

A valid access duration $t_{valid}$ refers to an access duration during which the agent does not suffer jamming at this time, which is expressed as:

$$t_{valid} = a_2 - t_{jam} \tag{11}$$

Where $t_{jam}$ denotes a length of a time slot under jamming.

By comparison, the beneficial effects of the present disclosure are described. The comparison is shown as follows:
(1) The method proposed in embodiments of the present disclosure combines prior knowledge, double actions and biased information;
(2) A traditional reinforcement learning method combines prior knowledge, single actions and biased information, that is, biased information is included, and a Q-table is two-dimensional;
(3) A traditional reinforcement learning method does not use prior knowledge or prior information, where the method uses the double actions in the embodiments of the present disclosure, and the Q-table is three-dimensional; and
(4) A traditional reinforcement learning method does not use prior knowledge or prior information, where the method uses the double actions, and the Q-table is two-dimensional.

Figure 3:
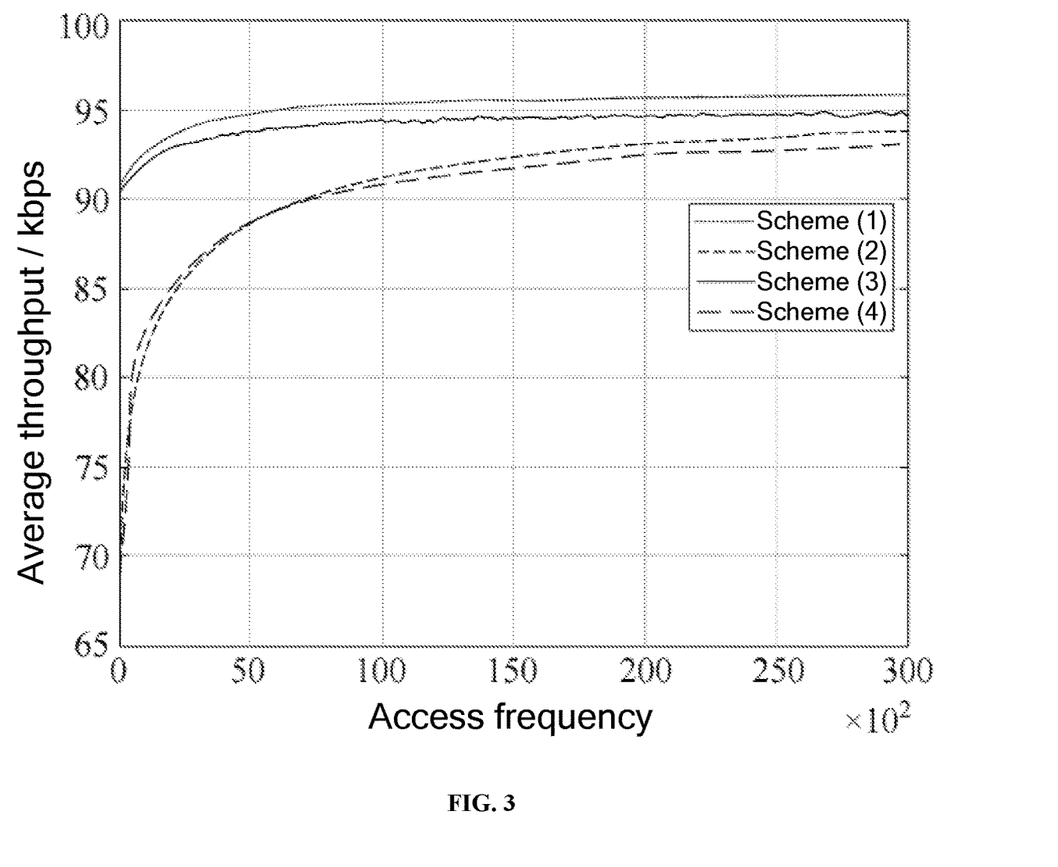
FIG. 3 is a simulated chart illustrating average throughputs under four schemes.

FIG. 3 shows comparison of average throughputs under four schemes. As can be seen, Scheme (3) has a higher exploration rate at the early stage, but multi-action exploration does not yield higher throughputs during convergence. Compared with Scheme (3), Scheme (2) can achieve desirable throughputs with a lower exploration rate. The method (Scheme (1)) of the present disclosure can achieve convergence after about 10,000 iterations. Compared with Scheme (3), the method of the present disclosure can improve the convergence speed by about 66%, and compared with the other three schemes, the average throughputs can be increased by about 3.0%, 2.16% and 1.09%, respectively.

Figure 4:
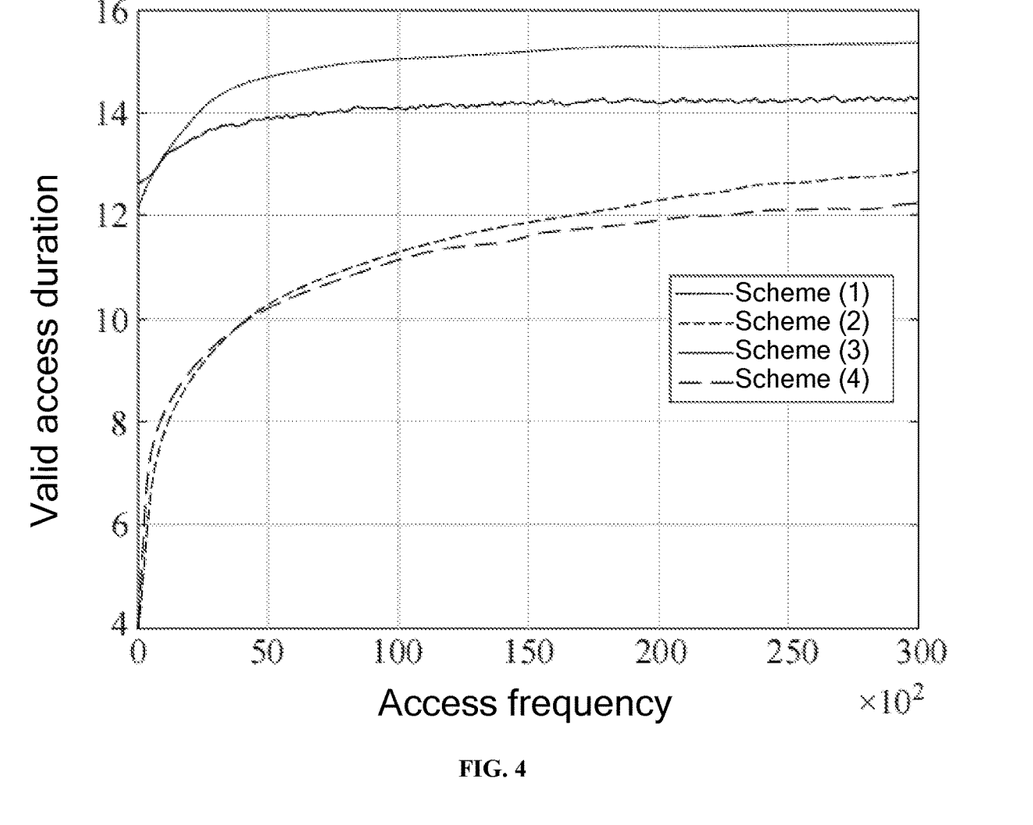
FIG. 4 is a simulated chart illustrating valid access durations under four schemes.

FIG. 4 shows comparison of valid access durations under four schemes. A longer valid access duration means full use of the current spectrum, which reduces the frequency of channel switching. After full exploration, the scheme without prior knowledge only reaches the initial level of the scheme with prior knowledge. Scheme (2) has the highest convergence speed, but does not see great improvement in the learning effect. The method can effectively improve the duration and at the same time achieve convergence after about 15,000 iterations, which sees increase by about 25.88%, 19.80% and 7.48% respectively compared with the contrast algorithms.

Through the comparison between a single-action output algorithm and a double-action output algorithm in the simulation results, it is concluded that the method proposed by the present disclosure can improve the situation of large action space. Compared with the an algorithm without using prior knowledge, a reinforcement learning algorithm based on prior knowledge or biased information can learn with a lower exploration rate; at the same time, the method can obtain good performance with higher convergence speed.

Considering the influence of the accuracy of prior knowledge on the reinforcement learning algorithm, the present disclosure performs simulation for prior knowledge at varying degrees to verify the algorithm performance. In order to demonstrate the validity of the method, the prior knowledge with prior accuracy of 94.77% is set as reference prior knowledge, without the need for performing learning iterations.

Figure 5:
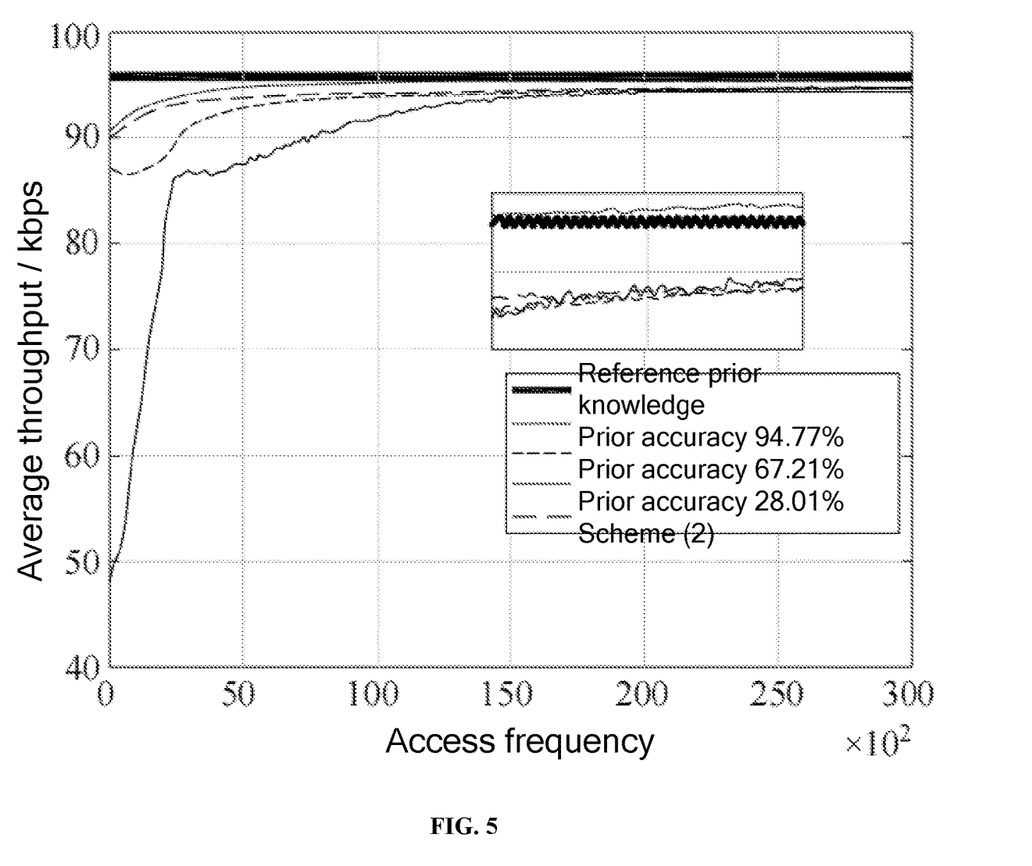
FIG. 5 is a simulation chart illustrating average throughputs in case of different levels of prior accuracy according to the method of the present disclosure.

In the meanwhile, the influence of the accuracy of prior knowledge on the performance of the method is also discussed in the simulation; and FIG. 5 shows the comparison of the average throughputs in the case of different levels of prior accuracy according to the method of the present disclosure. It can be seen that when the prior knowledge is not accurate, the performance at the early stage may be not ideal, but as the iteration proceeds, different levels of prior accuracy can converge to the same level as the reference prior knowledge. In the case of the same accuracy of prior knowledge, the biased information learning algorithm has performance similar to that of the method of the present disclosure. With iteration proceeds, the improvement of the scheme of the present disclosure is higher than that of Scheme (2), and the accuracy is higher than that of reference prior knowledge after about 15,000 iterations.

Figure 6:
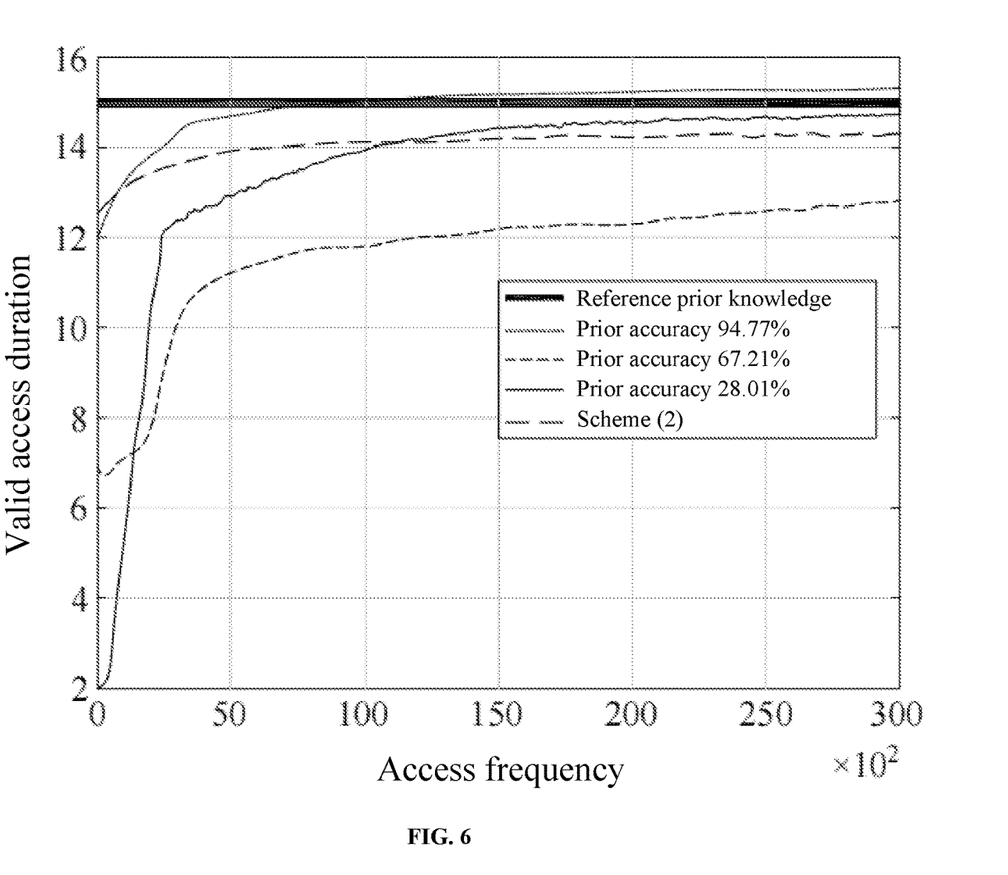
FIG. 6 is a simulation chart illustrating average throughputs in case of different levels of prior accuracy according to the method of the present disclosure.

FIG. 6 shows the comparison of valid access durations in case of different levels of prior accuracy according to the method of the present disclosure. Through iteration, agents with different levels prior accuracy can achieve a longer access duration. In the case of the same level of accuracy of prior knowledge, the method of the present disclosure can quickly exceed the Scheme (2) and exceed the accuracy of reference prior knowledge after about 10,000 iterations. It means that the method of the present disclosure can make more full use of the spectrum and reduce the switching loss.

By simulating prior knowledge at varying degrees, it is concluded that the method proposed in the present disclosure enables effective utilization of prior knowledge, and can remove harmful or even wrong actions, thereby effectively improving algorithm performance.

A prior knowledge accuracy model is constructed, and a Q-table is initialized using prior knowledge to guide an agent to accelerate algorithm convergence and improve algorithm performance. In view of the influence of different levels of accuracy of prior knowledge on agent learning, the present disclosure considers the reward value as biased information, and encourages the agent to choose an action with a high reward value and reduce the influence of wrong actions on a system, thereby avoiding the negative guidance of inaccurate prior knowledge on the agent. The simulation results show that the proposed method can significantly reduce the number of explorations required to obtain highly expected rewards, and at the same time improve the final learning performance and make full use of prior knowledge with different levels of different accuracy, so as to improve the gain and the efficiency of spectrum access.

In addition, the present disclosure provides a spectrum access system using prior knowledge-based double-action reinforcement learning, used for implementing the method put forward in embodiments of the present disclosure. The system includes a prior information evaluating and state confirming unit configured to evaluate and screen prior knowledge, initialize a Q-table, and confirm a current state; and a learning unit configured to perform Q-learning by: firstly, decomposing an action space into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, where the biased information is a reward value. The method in the embodiments of the present disclosure can be implemented by using the proposed system, thereby realizing efficient spectrum access.

What is claimed is:

1. A spectrum access method using prior knowledge-based double-action reinforcement learning, comprising:
evaluating and screening prior knowledge, initializing a Q-table, and confirming a current state; and
decomposing an action space of the Q-table into two dimensions with an action in one dimension defined as a channel chosen by an agent, and an action in the other dimension defined as a number of time slots of an access channel, and choosing actions in turn according to the dimensions; then performing spectrum access according to the actions chosen; and finally, updating the Q-table in combination with biased information, wherein the biased information is a reward value corresponding to a channel capacity and a channel bandwidth;
wherein said choosing actions in turn according to the dimensions specifically comprises: setting two dimension parameters x and y which are random numbers of [0,1];
when $x<\varepsilon$, choosing an action in one dimension according to a random probability, otherwise, calculating a mean value of the Q-table in the dimension, and choosing an action in the dimension according to a maximum value, wherein F is a constant; or
when $y<\varepsilon$, choosing an action in the other dimension according to a random probability, otherwise, calculating an action in the dimension according to a maximum value.

2. The method according to claim 1, wherein said updating the Q-table in combination with biased information specifically comprises:
acquiring a reward value;
determining a state value at a next moment;
updating the Q-table; and
adjusting the Q-table using the biased information.

3. The method according to claim 2, wherein said adjusting the Q-table using the biased information specifically comprises:
in case the reward value is taken as the biased information, and the reward value is less than zero, if $Q(s, a_1, a_2)>0$, making $Q(s, a_1, a_2)=const1 \times Q(s, a_1, a_2)$; otherwise, making $Q(s, a_1, a_2)=(1/const1) \times Q(s, a_1, a_2)$, wherein const1 denotes a constant, and $a_1$ and $a_2$ respectively denote actions in the two dimensions; and
in case the reward value is less than a statistical average reward value $\overline{R}$, if $Q(s, a_1, a_2)>0$, making $Q(s, a_1, a_2)=const2 \times Q(s, a_1, a_2)$; otherwise, making $Q(s, a_1, a_2)=(1/const2) \times Q(s, a_1, a_2)$, wherein const2 denotes a constant.

4. The method according to claim 3, wherein said acquiring a reward value specifically comprises: taking a ratio of a channel capacity to a utility function as a reward which is expressed in the following formula:

$$R = u_1 \cdot u_2 \cdot \left(\frac{c}{u \cdot W} - \frac{1}{k_1 \cdot Th}\right)$$

wherein c denotes a channel capacity, u denotes a Kosca utility function, W denotes a channel bandwidth, $k_1$ denotes a constant, Th denotes a jamming threshold, $u_1$ denotes a reward value balancing coefficient on the order of magnitudes, and $u_2$ denotes a duration guidance coefficient.

5. The method according to claim 4, wherein a Q-value is updated according to the following formula:

$$Q(s,a_1,a_2)=(1-\alpha)\times Q(s,a_1,a_2)+\alpha\times[r+\gamma_a^{max}Q(s',a_1,a_2)]$$

wherein α denotes a learning rate, γ denotes an attenuation factor, s and s' denote a state at a current state and a state at a next moment, respectively, and a denotes an optimal action set in the state at the next moment, wherein α comprises $a_1$ and $a_2$.

6. The method according to claim 1, wherein said evaluating and screening prior knowledge specifically comprises:
defining accuracy of the prior knowledge according to Pearson's correlation coefficient, and choosing information with high accuracy as prior information.

7. The method according to claim 1, wherein said evaluating and screening prior knowledge specifically comprises: defining accuracy of the prior knowledge according to Pearson's correlation coefficient, and choosing information with high accuracy as prior information.

8. The method according to claim 2, wherein said evaluating and screening prior knowledge specifically comprises:
defining accuracy of the prior knowledge according to Pearson's correlation coefficient, and choosing information with high accuracy as prior information.

9. The method according to claim 3, wherein said evaluating and screening prior knowledge specifically comprises:
defining accuracy of the prior knowledge according to Pearson's correlation coefficient, and choosing information with high accuracy as prior information.

10. The method according to claim 4, wherein said evaluating and screening prior knowledge specifically comprises:
defining accuracy of the prior knowledge according to Pearson's correlation coefficient, and choosing information with high accuracy as prior information.

11. The method according to claim 5, wherein said evaluating and screening prior knowledge specifically comprises:
defining accuracy of the prior knowledge according to Pearson's correlation coefficient, and choosing information with high accuracy as prior information.

12. The method according to claim 6, wherein a state at any moment involves a difference value and a mean value of first two time slots of each channel.

13. A spectrum access system using prior knowledge-based double-action reinforcement learning, the system comprising:
a prior information evaluating and state confirming unit configured to evaluate and screen prior knowledge, initialize a Q-table, and confirm a current state; and
a learning unit configured to decompose an action space of the Q-table into two dimensions with an action in one dimension defined as a channel chosen by an agent, and an action in the other dimension defined as a number of time slots of an access channel, and choose actions in turn according to the dimensions; then perform spectrum access according to the actions chosen; and finally, update the Q-table in combination with biased information, wherein the biased information is a reward value corresponding to a channel capacity and a channel bandwidth;
wherein said choosing actions in turn according to the dimensions specifically comprises: setting two dimension parameters x and y which are random numbers of [0,1];
when x<ε, choosing an action in one dimension according to a random probability, otherwise, calculating a mean value of the Q-table in the dimension, and choosing an action in the dimension according to a maximum value, wherein F is a constant; or
when y<ε, choosing an action in the other dimension according to a random probability, otherwise, calculating an action in the dimension according to a maximum value.

14. The spectrum access system according to claim 13, wherein said updating the Q-table in combination with biased information specifically comprises:
acquiring a reward value;
determining a state value at a next moment;
updating the Q-table; and
adjusting the Q-table using the biased information.

15. The spectrum access system according to claim 14, wherein said adjusting the Q-table using the biased information specifically comprises:
in case the reward value is taken as the biased information, and the reward value is less than zero, if $Q(s, a_1, a_2)>0$, making $Q(s, a_1, a_2)=const1\times Q(s, a_1, a_2)$; otherwise, making $Q(s, a_1, a_2)=(1/const1)\times Q(s, a_1, a_2)$, wherein const1 denotes a constant, and $a_1$ and $a_2$ respectively denote actions in the two dimensions; and
in case the reward value is less than a statistical average reward value $\overline{R}$, if $Q(s, a_1, a_2)>0$, making $Q(s, a_1, a_2)=const2\times Q(s, a_1, a_2)$; otherwise, making $Q(s, a_1, a_2)=(1/const2)\times Q(s, a_1, a_2)$, wherein const2 denotes a constant.

16. The spectrum access system according to claim 15, wherein said acquiring a reward value specifically comprises: taking a ratio of a channel capacity to a utility function as a reward which is expressed in the following formula:

$$R = u_1 \cdot u_2 \cdot \left(\frac{c}{u \cdot W} - \frac{1}{k_1 \cdot Th}\right)$$

wherein c denotes a channel capacity, u denotes a Kosca utility function, W denotes a channel bandwidth, $k_1$ denotes a constant, Th denotes a jamming threshold, $u_1$ denotes a reward value balancing coefficient on the order of magnitudes, and $u_2$ denotes a duration guidance coefficient.

17. The spectrum access system according to claim 16, wherein
a Q-value is updated according to the following formula:

$$Q(s, a_1, a_2) = (1-\alpha)\times Q(s, a_1, a_2) + \alpha \times \left[r + \gamma \max_a Q(s', a_1, a_2)\right]$$

wherein α denotes a learning rate, γ denotes an attenuation factor, s and s' denote a state at a current state and a state at a next moment, respectively, and a denotes an optimal action set in the state at the next moment, wherein a comprises $a_1$ and $a_2$.

18. The spectrum access system according to claim 13, wherein said evaluating and screening prior knowledge specifically comprises: defining accuracy of the prior knowledge according to Pearson's correlation coefficient, and choosing information with high accuracy as prior information.

* * * * *